INVENTOR
SILAS A. BROWN

March 14, 1967 S. A. BROWN 3,308,698
FABRICATING ENDLESS BELTS FROM STRIPS OF WEBBING
Filed Feb. 14, 1964 2 Sheets-Sheet 2

INVENTOR
SILAS A. BROWN
BY
ATTORNEY 3,308,698
FABRICATING ENDLESS BELTS FROM STRIPS OF WEBBING
Silas Arthur Brown, Lake Elmo, Minn., assignor to Buckbee-Mears Company, St. Paul, Minn., a corporation of Minnesota
Filed Feb. 14, 1964, Ser. No. 344,971
6 Claims. (Cl. 83—78)

This invention is directed toward a method and apparatus for producing endless belts from strips of perforated metallic webbing. In particular, a structural embodiment of the invention provides a fixture for holding and measuring strips of metallic webbing while producing endless belts of said material. The fixture is a multiple purpose device. It serves to hold an end of the strip while providing a standard length measurement to which the strip is measured; it holds both ends of the strip while it is being cut to the required length; it provides a cutting tool for precisely cutting the strip as desired; and it holds the two ends of the strip in juxtaposition while they are being welded together to form the endless belt.

The objects and features of this invention may be best pointed out with regard to producing endless belts constructed of a particular type of material for a particular use. It should be understood, however, that this is not intended to limit the scope of the invention. The particular type of belt to be described is referred to as a "tobacco belt" since it is utilized in the processing and manufacturing of tobacco products.

Elongated strips of metallic material containing a repetitively uniform array of rows and columns of apertures or perforations which are formed into endless belts, are used to transport raw material in the tobacco fabrication process. Heretofore production of tobacco belts has been unsatisfactory for various reasons. The biggest reason has been the cost. The expense incurred in the steps of first measuring off the desired length to provide the proper size belt, then cutting the material to length with a relatively accurate cut which does not pass through any of the apertures in the strip and lastly permanently joining the two ends of the strip together without closing off any of the apertures, has been relatively large. This invention overcomes the above-stated difficulties which had been previously encountered.

Briefly, this invention comprises a circular, disk-like body member having a thickness dimension exceeding that of the width of the strip being processed. The disk member has a groove or channel along its entire periphery between the front and back surfaces in which the strip of material or webbing being processed is nested. The size of the disk is such that its circumference, measured along the bottom of the channel, is essentially equal to the desired dimension of the endless belt to be produced. At one location along the periphery of the disk member is a cutting station which includes a pair of clamps and a knife-edge cutting member. With a strip of the apertured or perforated material nested in the peripheral slot or groove and the ends therof respectively clamped by the cutting station clamps, the cutter is brought to bear down upon the strip to cut through it but is oriented so that the cut line does not pass through any of the apertures. Preferably this is done by cutting in a straight line which is diagonal to the row and column array of the apertures in the strip. Since the length of the channel bottom is substantially equal to the desired over-all length of the endless belt, the strip is now cut to the desired length. As a further feature of the invention, there is further included means mounted on the disk member for adjusting the length of the strip prior to cutting to account for variations that might occur to insure an accurate length. In addition to the cutting station there is located on the disk member at a position removed from the cutting station along the periphery of the disk member, a welding station which includes a further pair of clamping members which hold the ends of the cut strip in abutting relationship while providing a sufficient opening in the area adjacent the butting ends to allow a welding tool to weld the two ends together to form the endless belt.

These and other objects and features will be pointed out during the course of the following detailed description, with reference to the accompanying drawings in which.

Figures 1, 2:
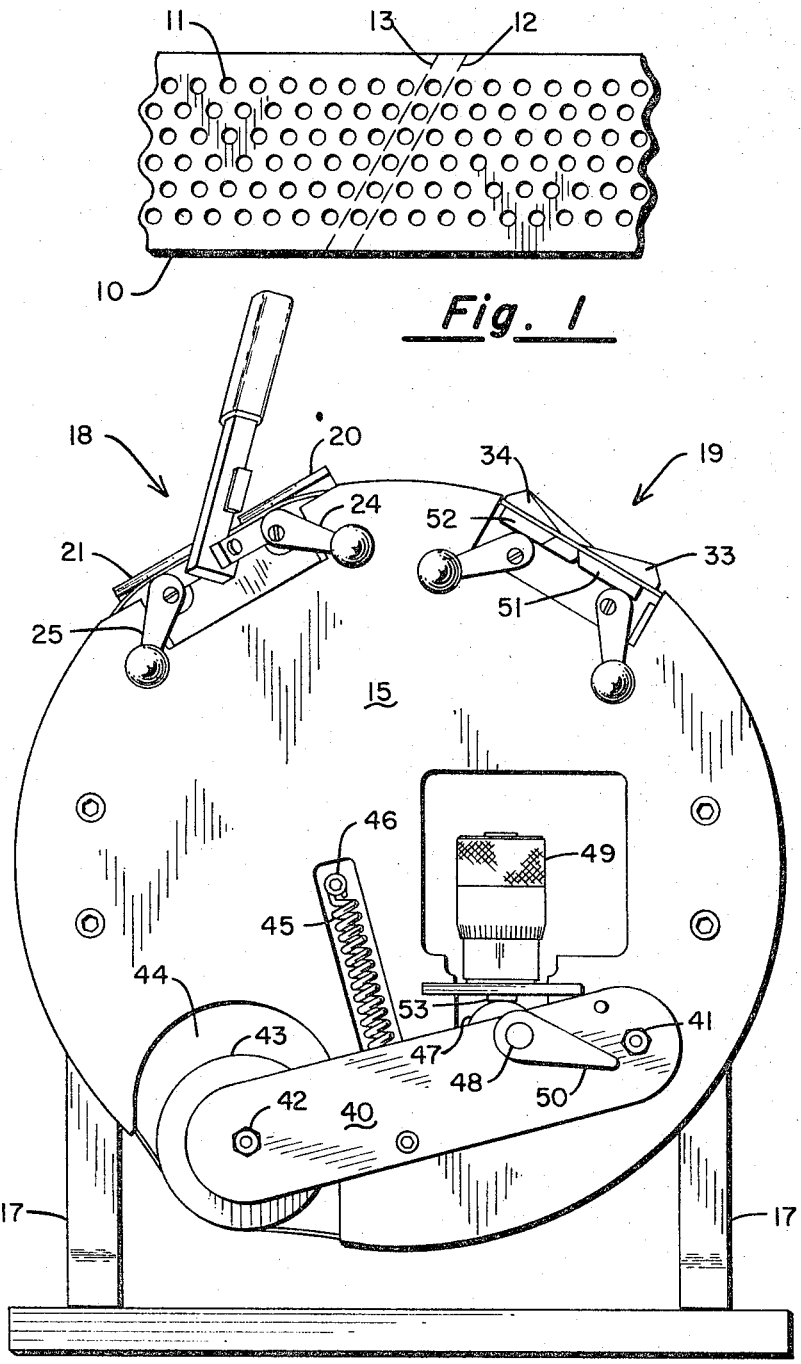
FIG. 1 illustrates a section of a strip of webbing which may be processed according to this invention.
FIG. 2 is an overall front view of a fixture constructed to function according to the inventive process.

Referring now to FIG. 1, there is illustrated a section of a strip of stainless steel 10 which may be, for example, in the order of one-half inch wide and have a thickness ranging from .002 to .010 inches. Throughout the length and covering a substantial width of the strip 10 is a repetitively uniform array of circular apertures or perforations 11 arranged in a symmetrical pattern of horizontal rows and vertical columns. A pair of parallel dashed lines, 12 and 13, running across the strip diagonal to the rows and columns of apertures illustrate the cut line effected by the cutting tool when the strip is cut to the desired length. It should be noted that neither of the cut lines pass through any of the apertures and that the straight diagonal lines pass through the strip between the apertures. It should be noted that the section of the material removed by the cut, corresponding to the area between the parallel diagonal cut lines, must be accounted for when measuring off the desired length of the strip. Means for compensating for this variation in the dimension are included in the structural embodiment of this invention and will be subsequently described in detail. Furthermore, it should be noted that the cut lines 12 and 13 are complementary to one another so that after the cut these ends can be brought into abutting relationship and the continuous and symmetrical pattern of the circular apertures will be continuous.

Referring now to the over-all view of FIG. 2, the preferred structural embodiment of the invention comprises a fixture which includes a relatively large circular disk 15 containing a circumference groove or channel 16 (FIG. 4) between the front and back surfaces. The groove 16 may be constructed in any convenient manner such as by attaching together two identical flat, parallel disk members in spaced apart relationship, or by machining out the groove along the periphery of a relatively thick disk. The disk 15 is held standing in an upright position by a pair of supporting legs 17 attached thereto by any convenient means.

Figure 3:
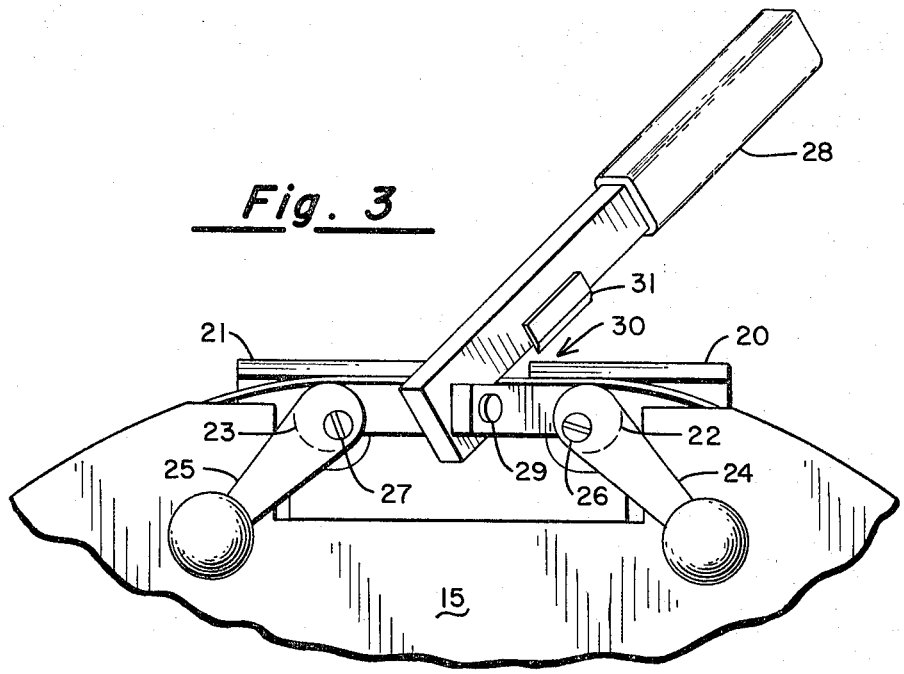
FIG. 3 is a detailed illustration of the cutting station located on the periphery of the fixture.

Located along the periphery of the fixture at a first position is a cutting station, designated generally 18, and displaced therefrom clockwise along the periphery of the fixture at a second location is a welding station generally designated 19. The cutting station construction is shown more clearly in detail in FIG. 3 and details of the welding station are more clearly shown in FIG. 4. In the former a pair of stationary clamp members 20 and 21 are attached to the disk member 15 and overhang but are raised above the peripheral groove 16. A pair of eccentric, movable clamp members, shown by dashed lines at 22 and 23, are pivotally attached to the disk member 15 by any convenient means and are brought into clamping action by their respective handles 24 and 25. Handle 24 manually rotated counterclockwise about pivot rod 26 will cause the surface of the movable cam-like clamping member 22 to bear up on the downward facing inner surface of the stationary clamp member 20 to firmly clamp the strip of webbing therebetween, as shown in FIG. 3. In a similar manner the strip of webbing will be clamped between fixed clamp member 21 and movable clamp member 23 by the rotation of handle 25 clockwise about its pivot rod 27.

An elongated cutting tool generally designated 28 is hinged at 29 to the disk member 15 so that it may be swung downward toward and part way into the channel 16 in the gap 30 between the fixed clamp members 20 and 21. When the cutting tool 28 is swung down in this manner, its side knife edges at 31 bear down upon the webbing which is tautly held by the clamp devices, and cuts through the webbing to sever it to a proper length. As indicated in FIG. 3 and as illustrated in FIG. 1, the cutting tool 28 is disposed with respect to the orientation of the strip of webbing, as it is nested in the groove 16, to effect a cut which is diagonal with respect to the rows and columns of perforations in the webbing. In the practice of this invention the edges of the fixed clamp members 20 and 21 which define the gap 30 are used as guides to position the strip of webbing before cutting it to insure that the cut lines will not pass through any of the apertures in the strip, as illustrated by the dashed lines 12 and 13 in FIG. 1.

Figure 4:
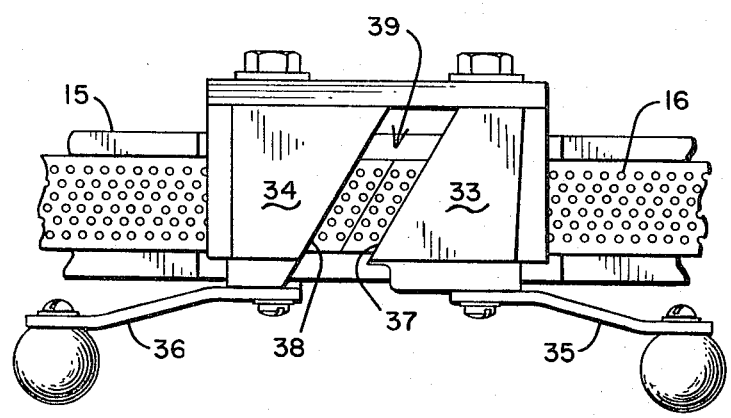
FIG. 4 is a detailed illustration of the welding station also located on the periphery of the fixture.

Located counterclockwise from the cutting station 18 along the peripheral edge of the disk 15 is the welding station 19 which is shown in greater detail in FIG. 4. Similar to the cutting station, the welding station includes a pair of clamps comprising a pair of upper fixed clamp members 33 and 34 which are fixedly attached by any convenient means to the disk member 15 and overlay but are elevated above the groove 16. A pair of manually operable handles 35 and 36 are manipulated to clamp the strip of webbing between these fixed clamp members and corresponding movable clamp members 51 and 52 (FIG. 2) which are located beneath the respective fixed clamp members. The clamps at the welding station 19 operate in a manner similar to those located at the cutting station 18. There is some difference in construction however since the bottom movable clamp members associated with the respective fixed members 33 and 34 are more in the order of lower jaws. They form a pair of lips with the corresponding facing edges, 37 and 38, of the upper clamp members 33 and 34 to define a gap 39 between the two clamps. Gap 39 provides a two-fold function. First, it permits the ends of the strip which has been previously cut at the cutting station 18 to be viewed so that they may be properly positioned in butting relationship and correct orientation while being held clamped at the welding station. Secondly, they provide an access area to permit a welding tool to be brought into play to weld the two ends together to form the continuous belt. Operation of the clamps at the welding station 19 is similar to that at the cutting station 18 so that when the strip is located between the jaws of the clamping members the respective handles 35 and 36 are rotated about their respective axes to close the jaws of the corresponding clamping members to clamp the strip in the desired position.

In the operation of this invention, a strip of webbing is cut off of a continuous roll to a length somewhat greater than that required to form the endless belt of the desired dimensions. One end is then inserted between the movable and fixed clamp members 22 and 20 at cutting station 18 with a short piece of the strip extending into the gap 30. Using the diagonal edge of clamp member 20 as a guide, the strip is positioned so that when the cutting tool 28 is brought into play it will sever the strip with a cut line which does not pass through any of the apertures in the strip. When in the proper position, the handle 24 is manipulated to clamp the first end of the strip at the cutting station. The strip is then nested in the groove 16 extending along the periphery of the disk 15 while passing through the open jaws of the clamps at the welding station 19 and back around to the other clamp at the cutting station 18. The strip is pulled taut in the groove since the length of the groove along the bottom thereof determines the proper length of the strip to produce a belt of the required dimension. The handle 25 is then manipulated to clamp the other end of the strip between the fixed and movable clamp members, 21 and 23 respectively. Again, a small piece of this end of the strip extends into the gap 30. The fixture dimensions are such that if the first end of the strip has been accurately positioned before clamping, the other end can be clamped and blade 28 will not sever the strip through any of the apertures. The cutting blade 28 is then brought down to bear on the strip in the gap 30 to cut it to the desired length.

Clamp members 20 and 22 are then loosened and one end of the strip is slid along the groove 16 until it is located somewhere in gap 39 at the welding station 19 and it is then clamped between the jaws of clamp member 33 by manipulating handle 35. The handle 35 is then loosened and the other end of the strip is brought forward to the welding station between the jaws of clamp member 34 until the two ends of the strip are in butting relationship in the gap 39. The other end of the strip is then secured in this position by manipulation of handle 36. A welding tool, not shown, is then brought into play to weld the two ends together without closing up any of the apertures so that there is formed an endless belt of the desired dimension containing a continuous repetitive pattern of apertures.

The remaining elements contained in the fixture of this invention and shown in FIG. 2 will now be described. It can be observed that the cutting tool 28 is not a single bladed cutter so that a section of the strip is severed, as shown in FIG. 1. If this were not accounted for, when the strip is then positioned at the welding station there would be a gap between the ends of the strip. This is compensated for by providing lever arm 40 which is pivotally attached to the front of disk member 15 at one end 41 and carries at its other end 42 a roller 43 having a peripheral slot which corresponds in width and depth to groove 16. An elongated spring 45 is attached at one end 46 to the disk 15 and at its other end to lever arm 40 by any convenient means, not shown. The spring is normally biased to pull the lever arm 40 clockwise with respect to its pivot point 41 so that the roller 43 is located in the semi-circular shaped cut-out at 44 in the disk member 15. Counteracting this effect of spring 45 is a positioning cam 47 which is attached by a pin at 48 to lever arm 40. Pushing downward against the adjusting cam is an adjustment rod 53 which is axially movable up and down by micrometer adjusting knob 49. The effect of the positioning cam 47 and its adjustment rod 53 on the lever arm 40 is to cause the latter to swing out counterclockwise with respect to the pivot point 41 so that roller 43 swings away from the cut-out 44 in the disk member 15 to effectively increase the over-all length of the peripheral groove 16 around the disk member. The amount by which this groove is lengthened can be accurately set by the micrometer knob 49 to provide additional stripping to compensate for the amount removed from the strip by the cutting operation. After the strip has been severed but before it is clamped at the welding station, the cam 47 can be disengaged from the positioning rod by manipulation of the small switch arm 50. The tension in spring 45 pulls the lever arm 40 clockwise so that the roller 43 is pulled back at least partway into the cut-out area. In this manner, then, when the strip of webbing is pulled taut and clamped at the welding station 19, the severed section of the strip has been compensated for so that the two ends of the strip can be held in abutting relationship for welding. It should be noted that for producing belts of this nature, the micrometer knob 49 can be adjusted to a single setting and the switch arm 50 alternately manipulated to position lever arm 40 as required during the respective cutting and welding operations. Obviously if a different type of cutting tool were utilized, or if larger sized belts were desired, the setting of the micrometer knob would be adjusted accordingly. Another important function of the lastly described mechanisms cannot be overlooked. Since the ends of the strip are welded together while the strip rests in the groove 16, sufficient slack, with respect to the length of the slot, must be introduced into the belt to permit removal after welding. This is accomplished by lever arm 40 being positioned so that the roller 43 juts out of the cut-out 44 to a sufficient degree to be engaged with the strip while it is welded. After welding, the roller 43 is withdrawn into the cutout so that the belt has sufficient slack to be slipped over the walls of the groove 16.

It should be pointed out with regard to the welding station 19 that although the jaws of the clamping members must be spaced close enough together to ensure that the two ends of the strip are held together while being welded they cannot be held in a manner which might impede the welding operation or which might convey heat away from the welding tool at such a fast rate to make the weld unsatifactory.

It has been found that by using the fixture described which functions in the manner contemplated by this invention, that belts containing symmetrical and repetitive patterns of rows and columns of apertures have been formed from strips of stainless steel ranging from 56 inches up to 10 feet in length, being in the order of .500 inch wide and ranging from .002 to .010 inch thick. These have been produced at a rate required to make the production efficient and economical and minimizing the quantity of defective units such as had been previously encountered. Obviously for the larger size endless belts a larger dimension fixture is required but it would operate in the same manner as described hereinabove.

I claim:

1. A fixture for use in making elongated thin strips of perforated metallic material into endless belts, comprising: a circular member having a peripheral groove in which the strip of material is nested, the length of said groove substantially defining the desired length of the endless belt; a first station located on the periphery of the circular member including, a pair of clamps for detachably clamping the respective ends of the strip to the circular member and a cutting device pivotally mounted to the circular member for cutting through the strip with a straight diagonal cut line which does not pass through any of the perforations; and a second station located on the periphery of the circular member displaced from said first station which includes another pair of clamps for detachably clamping the ends of the strip in abutting relationship along the cut line while they are being welded together.

2. The fixture as in claim 1 in which the peripheral groove contains a short gap formed by a space in the circular member; and means adjustably movable toward and away from the circular member at least partly within said space for selectively adjusting the length of strip nesting in the groove.

3. A fixture for use in producing endless belts from elongated strips of thin metallic material containing a uniform repetitive pattern of rows and columns of apertures, comprising: a generally circular plate member containing a peripheral channel formed between its front and back faces for receiving the strip in nesting engagement, the channel length substantially defining the desired length of the belt to be produced; a cutting station located on the periphery of the plate member for cutting the strip to the desired length comprising, a first pair of clamps for detachably clamping the respective ends of the strip while resting tautly in the channel, and a cutting tool disposed between said clamps for severing the strip, while clamped, in a straight cut line running diagonally to the rows and columns of apertures without cutting through any of said apertures; a welding station located on the periphery of the plate member displaced from said first station where the ends of the strip are welded together after the cutting operation, said welding station comprising a second pair of clamps for detachably clamping the respective ends of the strip in butting relationship along the cut line with the clamp members spaced apart to allow the application of sufficient energy to the ends of the strip to weld them together while the butting relationship is maintained.

4. The fixture as in claim 3 further including means mounted on said plate member for effectively adjusting the length of the strip before it is cut.

5. The fixture as in claim 4 wherein said latter means comprise a lever arm pivotally attached at one end to said plate member in a manner such that its other end can swing substantially radially to and from said plate member.

6. The fixture as in claim 5 wherein said lever arm is positioned before welding so that its other end is swung away from the plate member with the strip in contact therewith thereby effectively measuring a length of the strip, and after welding said lever arm is positioned so that its other end is swung toward the plate member thereby introducing slack in the welded belt so that it may be removed from the peripheral channel.

References Cited by the Examiner

UNITED STATES PATENTS

| 503,341 | 8/1893 | Briggs | 83—176 |
| 945,185 | 1/1910 | Milas | 269—37 |
| 2,575,798 | 11/1951 | Dain | 269—154 X |

FOREIGN PATENTS 1,241,223   4/1960   France.

ANDREW R. JUHASZ, *Primary Examiner.*